United States Patent [19]
Nelson

[11] Patent Number: 5,895,288
[45] Date of Patent: Apr. 20, 1999

[54] PLANT POWER LINE

[76] Inventor: Fern W. Nelson, 987 Bianca Dr. NE., Palm Bay, Fla. 32905

[21] Appl. No.: 08/762,274

[22] Filed: Dec. 9, 1996

[51] Int. Cl.⁶ ..................................................... H01R 11/00
[52] U.S. Cl. ............................................ 439/502; 174/135
[58] Field of Search ................................ 439/501, 502, 439/505; 174/135; D11/117, 119, 143, 144, 151; D26/126, 127, 156

[56] References Cited

U.S. PATENT DOCUMENTS

| | | | |
|---|---|---|---|
| 4,984,685 | 1/1991 | Douglas | 439/501 |
| 5,130,496 | 7/1992 | Jenkins | 174/135 |
| 5,449,067 | 9/1995 | Cannon | 174/135 |
| 5,586,655 | 12/1996 | McBride | 174/135 |

*Primary Examiner*—Neil Abrams
*Assistant Examiner*—Brian J. Biggi

[57] ABSTRACT

A new plant power line for making cords of all types appear as a growing plant. The inventive device includes a planter container containing a hook and an electric cord having an elongated body with simulated leaves extending from the elongated body. The electric cord runs into the planter container and fastens to the hook and then extends out of the planter container.

9 Claims, 2 Drawing Sheets

PLANT POWER LINE

BACKGROUND OF THE INVENTION

1. Field of the Invention

The present invention relates to aesthetic electrical cord covers and more particularly pertains to a new plant power line for making cords of all types appear as a growing plant.

2. Description of the Prior Art

The use of aesthetic electrical cord covers is known in the prior art. More specifically, aesthetic electrical cord covers heretofore devised and utilized are known to consist basically of familiar, expected and obvious structural configurations, notwithstanding the myriad of designs encompassed by the crowded prior art which have been developed for the fulfillment of countless objectives and requirements.

Known prior art aesthetic electrical cord covers include U.S. Pat. No. 5,130,496; U.S. Pat. No. 5,397,243; U.S. Patent Des. 296,332; U.S. Pat. No. 4,454,374; U.S. Pat. No. 4,826,112 and U.S. Pat. No. 4,737,129.

While these devices fulfill their respective, particular objectives and requirements, the aforementioned patents do not disclose a new plant power line. The inventive device includes a planter container containing a hook and an electric cord having an elongated body with simulated leaves extending from the elongated body. The electric cord runs into the planter container and fastens to the hook and then extends out of the planter container.

In these respects, the plant power line according to the present invention substantially departs from the conventional concepts and designs of the prior art, and in so doing provides an apparatus primarily developed for the purpose of making cords of all types appear as a growing plant.

SUMMARY OF THE INVENTION

In view of the foregoing disadvantages inherent in the known types of aesthetic electrical cord covers now present in the prior art, the present invention provides a new plant power line construction wherein the same can be utilized for making cords of all types appear as a growing plant.

The general purpose of the present invention, which will be described subsequently in greater detail, is to provide a new plant power line apparatus and method which has many of the advantages of the aesthetic electrical cord covers mentioned heretofore and many novel features that result in a new plant power line which is not anticipated, rendered obvious, suggested, or even implied by any of the prior art aesthetic electrical cord covers, either alone or in any combination thereof.

To attain this, the present invention generally comprises a planter container containing a hook and an electric cord having an elongated body with simulated leaves extending from the elongated body. The electric cord runs into the planter container and fastens to the hook and then extends out of the planter container.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new plant power line apparatus and method which has many of the advantages of the aesthetic electrical cord covers mentioned heretofore and many novel features that result in a new plant power line which is not anticipated, rendered obvious, suggested, or even implied by any of the prior art aesthetic electrical cord covers, either alone or in any combination thereof.

It is another object of the present invention to provide a new plant power line which may be easily and efficiently manufactured and marketed.

It is a further object of the present invention to provide a new plant power line which is of a durable and reliable construction.

An even further object of the present invention is to provide a new plant power line which is susceptible of a low cost of manufacture with regard to both materials and labor, and which accordingly is then susceptible of low prices of sale to the consuming public, thereby making such plant power line economically available to the buying public.

Still yet another object of the present invention is to provide a new plant power line which provides in the apparatuses and methods of the prior art some of the advantages thereof, while simultaneously overcoming some of the disadvantages normally associated therewith.

Still another object of the present invention is to provide a new plant power line for making cords of all types appear as a growing plant.

Yet another object of the present invention is to provide a new plant power line which includes a planter container containing a hook and an electric cord having an elongated body with simulated leaves extending from the elongated body. The electric cord runs into the planter container and fastens to the hook and then extends out of the planter container.

Still yet another object of the present invention is to provide a new plant power line that helps beautify a room's decor.

Even still another object of the present invention is to provide a new plant power line that increases safety by helping to cover electrical outlets and helping to prevent tripping over electrical cords.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof Such description makes reference to the annexed drawings wherein.

DESCRIPTION OF THE PREFERRED EMBODIMENT

Figure 1:
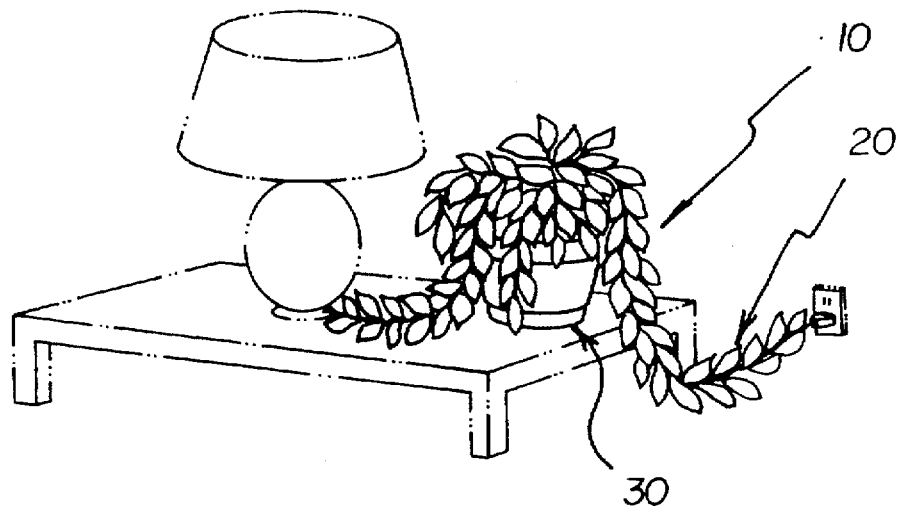
FIG. 1 is a right side perspective view of a new plant power line in use attached to a lamp and inserted in a electrical power socket according to the present invention.
Figure 2:
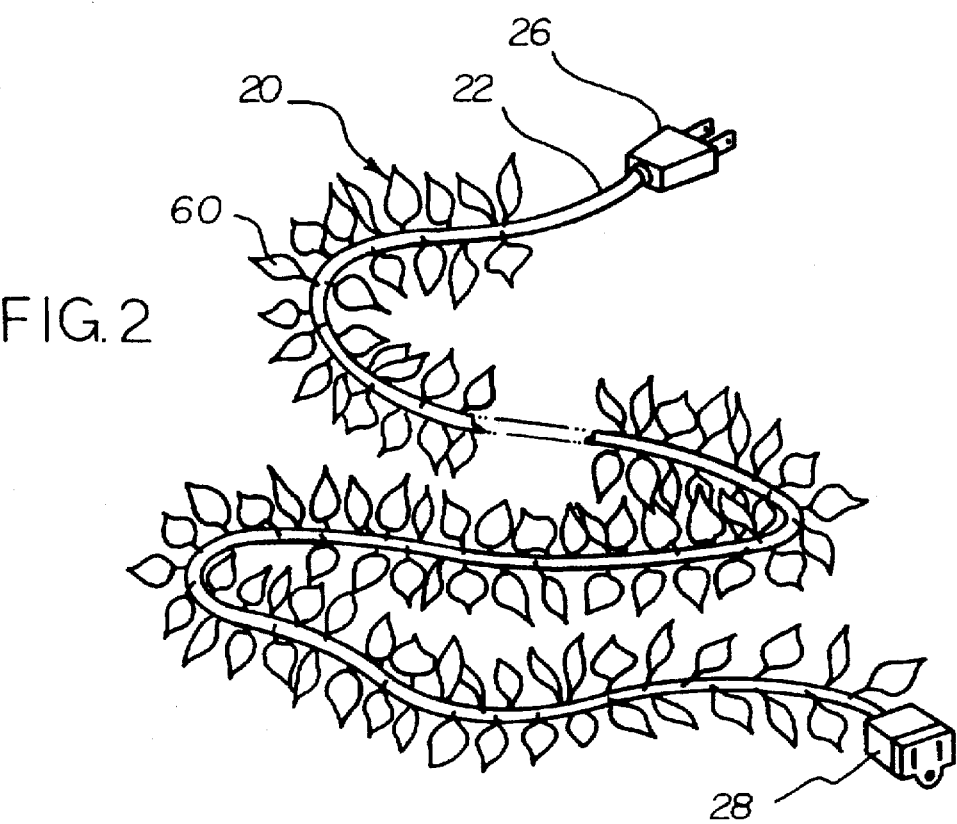
FIG. 2 is a side elevation view of the invention.
Figure 3:
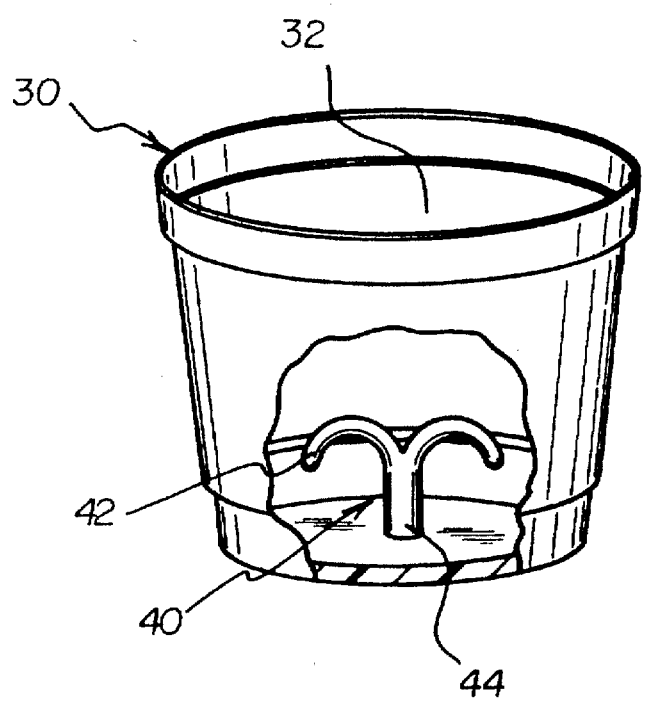
FIG. 3 is a partial exploded isometric illustration of the planter container showing the hook disposed in the interior chamber of the planter container.
Figure 4:
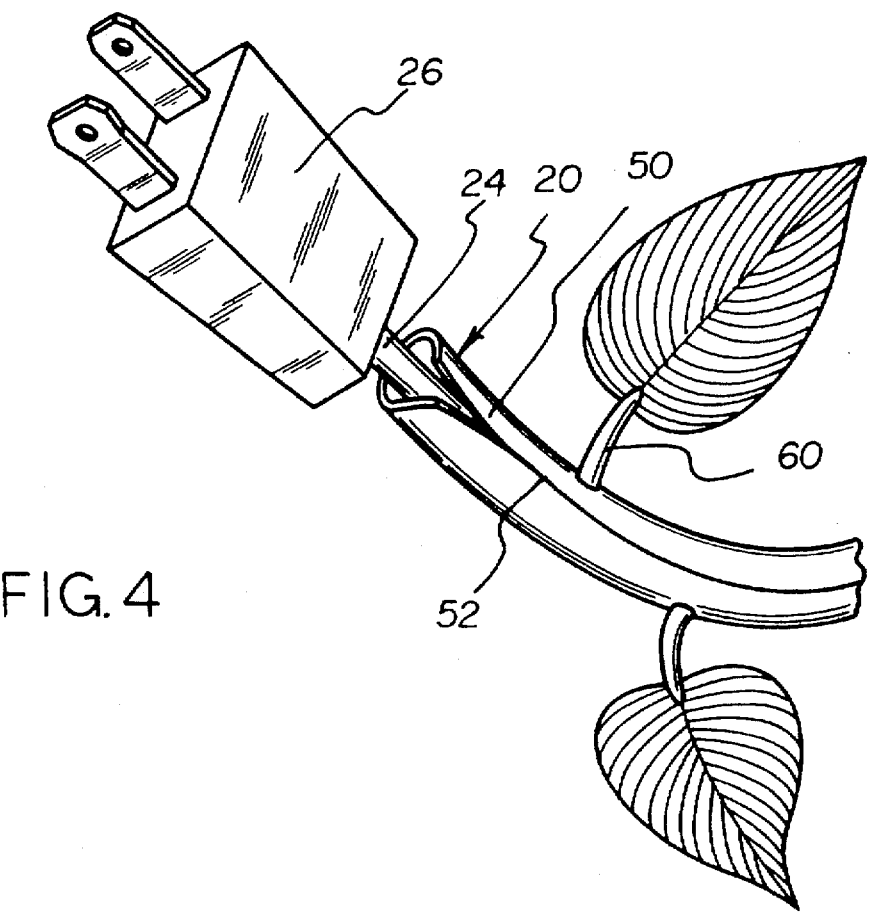
FIG. 4 is a side perspective view of the invention showing the cover body member and the longitudinal split.

With reference now to the drawings, and in particular to FIGS. 1 through 6 thereof, a new plant power line embodying the principles and concepts of the present invention and generally designated by the reference numeral 10 will be described.

More specifically, it will be noted that the plant power line 10 comprises an electric cord 20 having an elongated body 22 with simulated leaves 60 extending from the elongated body 22, a planter container 30, and a hook 40 placed in the planter container 30.

As best illustrated in FIGS. 1 through 6, it can be shown that the electric cord 20 has and elongated body 22, a plug 26 at one end, and a power tap 28 at its other end. A plurality of simulated leaves 60 extend outwardly from the elongated body 22. Ideally, the plug 26 is a polarized two prong plug, and the power tap 28 is a three way power tap. The electric cord 20 and simulated leaves 60 should be colored in such a way to make their appearance as life like as possible.

Optionally, the elongated body 22 can be made up of a removable cover body member 50 having a longitudinal split 52 extending throughout its length and an electric cord body member 24 placed in the longitudinal split 52 so that the cover body member 50 acts as a sheath and covers the electric cord body member 24. With this option, the simulated leaves 60 are attached to and extend outwardly from the cover body member 50. Ideally the cover body member 50 should be made of semi rigid plastic or rubber and colored appropriately to simulate a real plant.

The planter container 30 defines an interior chamber 32 into which at least one hook 40 is placed. The hook 40 has a base 44 and at least one hook end 42. The planter container 30 can be made of plastic or any typical material used to make planters. The hook 40 can be made of plastic or metal hook screws forming the hook end 42 screwed into a base 44 made of wood or any other suitable material into which large screws can be inserted. The base 44 may also be fastened to the planter container 30 to provide a more secure positioning of the hook 40 in the interior chamber 32. Another option is to have the planter container 30 manufactured to integrally include the hook 40 extending into the interior chamber 32.

The appearance of a growing plant is accomplished by running the elongated body 22 of the electric cord 20 into the interior chamber 32 of the planter container 30. The elongated body 22 is then fastened to the hook end 42 of the hook 40 and then extended out of the interior chamber 32. The plug end of the elongated body 22 is extended outwardly from the planter container 30 towards an electrical outlet for the plug 26. The power tap end of the elongated body 22 is extended outwardly from the planter container 30 to an area where the electric cord 20 is needed. Additional leaf runners can also be fastened to the hooks 40 to give the appearance of an actual growing plant.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant power line comprising:

an electric cord having an elongated body comprising an electric cord body member and a cover body member being disposed about said electric cord body member and having a longitudinal split therein, said electric cord having opposite ends and a medial portion, one end of said electric cord having a electrical plug thereon and the other end of said electrical cord having an electrical tap thereon;

a plurality of simulated leaves extending from said elongated body, said simulated leaves being mounted on and extending outwardly from said cover body member;

a planter container defining an interior chamber, said planter container having an upper opening for receiving a medial portion of said electric cord, and at least one hook mounted in the interior chamber of said planter container for hooking on a portion of said electric cord; and the medial portion of said elongated body of said electric cord being disposed in said interior chamber of said planter container and being hooked on said hook in said interior chamber, the opposite ends of said electric cord extending out of the interior chamber of said planter container for connection to an electrical wall outlet and to an electrical appliance;

wherein said planter container includes a base wall, and said hook comprises a pair of inverted J-shaped hook portions mounted on said base wall for anchoring said electric cord to the base wall of said planter container to resist upward movement out of said container of an electric cord hooked on said inverted J-shaped hook portions.

2. The plant power line of claim 1, wherein said planter container is made of plastic.

3. The plant power line of claim 1 wherein said cover body member is made of plastic.

4. The plant power line of claim 1 wherein said cover body member is made of rubber.

5. A plant power line comprising:

a cover body member having a longitudinal split, said cover body member being adapted for being disposed about an electric cord body member, said cover body member having opposite ends and a medial portion;

a plurality of simulated leaves being mounted on and extending outwardly from said cover body member;

a planter container defining an interior chamber, said planter container having an upper opening for receiving a medial portion of said cover body member, and at least one hook mounted in the interior chamber of said planter container for hooking on a portion of said cover body member; and the medial portion of said cover body member being disposed in said interior chamber of said planter container and being hooked on said hook in said interior chamber, the opposite ends of said cover body member extending out of the interior chamber of said planter container;

wherein said planter container includes a base wall, and said hook comprises a pair of inverted J-shaped hook portions mounted on said base wall for anchoring said cover body member to the base wall of said planter container.

6. The plant power line of claim 5, wherein said cover body member is made of plastic.

7. The plant power line of claim 5, wherein said cover body member is made of rubber.

8. The plant power line of claim 5, wherein said planter container is made of plastic.

9. A plant power line comprising:

an electric cord having an elongated body comprising an electric cord body member and a cover body member being disposed about said electric cord body member and having a longitudinal split therein, said electric cord having opposite ends and a medial portion, one end of said electric cord having a electrical plug thereon and the other end of said electrical cord having an electrical tap thereon;

a plurality of simulated leaves extending from said elongated body, said simulated leaves being mounted on and extending outwardly from said cover body member;

a planter container defining an interior chamber, said planter container having an upper opening for receiving a medial portion of said electric cord, and at least one hook mounted in the interior chamber of said planter container for hooking on a portion of said electric cord; and the medial portion of said elongated body of said electric cord being disposed in said interior chamber of said planter container and being hooked on said hook in said interior chamber, the opposite ends of said electric cord extending out of the interior chamber of said planter container for connection to an electrical wall outlet and to an electrical appliance;

wherein said planter container includes a base wall, and said hook comprises a pair of inverted J-shaped hook portions mounted on said base wall for anchoring said electrical cord to the base wall of said planter container to resist upward movement out of said container of an electric cord hooked on said inverted J-shaped hook portions;

wherein said cover body member comprises plastic; and wherein said planter container comprises plastic.

* * * * *